(12) United States Patent
Mardirossian (10) Patent No.: US 6,295,901 B1
(45) Date of Patent: Oct. 2, 2001

(54) METHOD AND APPARATUS FOR COUPLING A FIBER OPTIC CONNECTOR (75) Inventor: Hovhannes Habib Mardirossian, Morris Plains, NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/358,655

(22) Filed: Jul. 26, 1999

Related U.S. Application Data (63) Continuation-in-part of application No. 09/238,608, filed on Jan. 28, 1999, now abandoned.

(51) Int. Cl.⁷ .................................................. B25B 23/14
(52) U.S. Cl. .............................. 81/467; 81/119; 81/176.1
(58) Field of Search ......................... 81/467, 478, 176.1, 81/119, 120, 177.7

(56) References Cited

U.S. PATENT DOCUMENTS

| | | | |
|---|---|---|---|
| H226 | * | 3/1987 | Willet ........................................ 81/94 |
| 184,733 | * | 11/1876 | Sibert ........................................ 81/90 |
| 598,203 | * | 2/1898 | Johnson ..................................... 81/90 |
| 869,527 | * | 10/1907 | Shears ....................................... 81/150 |
| 1,303,157 | * | 5/1919 | Brockway .............................. 81/176.1 |
| 1,391,898 | * | 9/1921 | Kettler ...................................... 81/129 |
| 1,493,389 | * | 5/1924 | Rosenfield .......................... 81/176.1 |
| 1,502,156 | * | 7/1924 | Pearce et al. ...................... 81/176.1 |
| 1,522,320 | * | 1/1925 | Norwood .................................. 81/90 |
| 1,608,432 | * | 11/1926 | Ryan ........................................ 81/150 |
| 1,657,965 | * | 1/1928 | Haggerty ................................. 81/129 |
| 1,707,856 | * | 4/1929 | Hoffman .................................. 81/90 |
| 1,925,219 | * | 9/1933 | Weigt ....................................... 73/131 |
| 1,945,406 | * | 1/1934 | Adams ...................................... 81/90 |
| 2,786,378 | * | 3/1957 | Ethington et al. ..................... 81/478 |
| 3,019,681 | * | 2/1962 | Grissom .................................... 81/61 |
| 3,076,362 | * | 2/1963 | Able ......................................... 81/478 |
| 3,247,742 | * | 4/1966 | Woodbury ............................... 81/120 |
| 3,389,624 | * | 6/1968 | Pooler, Jr. ................................. 81/129 |
| 3,722,316 | * | 3/1973 | Hawkins et al. ....................... 74/524 |
| 3,897,701 | * | 8/1975 | Daniels et al. ......................... 81/483 |
| 4,085,633 | * | 4/1978 | Jackson et al. ......................... 81/111 |
| 4,414,736 | | 11/1983 | Fieberg et al. .......................... 29/747 |
| 5,146,813 | * | 9/1992 | Stanfill, Jr. .............................. 81/120 |
| 5,152,200 | * | 10/1992 | Kaplan .................................... 81/478 |
| 5,261,300 | | 11/1993 | Willett ........................................ 81/98 |
| 5,467,674 | * | 11/1995 | Thorn ...................................... 81/468 |
| 5,502,861 | * | 4/1996 | Spieler et al. ....................... 15/167.1 |
| 5,524,511 | * | 6/1996 | Taka's ................................. 81/176.15 |
| 5,533,254 | | 7/1996 | Gallo et al. ............................. 29/750 |
| 5,911,797 | * | 6/1999 | Trevorrow .......................... 81/176.1 |

FOREIGN PATENT DOCUMENTS 22 08 878 C 2 * 1/1983 (DE) ....................................... 81/467

OTHER PUBLICATIONS

Advertising Materials, Tools Torque Wrenches, M/A–COM Inc.

* cited by examiner

Primary Examiner—Joseph J. Hail, III
Assistant Examiner—David B. Thomas (57) ABSTRACT An apparatus and method for coupling a fiber optic connector is disclosed. In one embodiment for a fiber optic connector wrench in accordance with the present invention, the fiber optic connector wrench includes an engagement portion and a handle member having a first portion with a first longitudinal axis and a second portion with a second longitudinal axis. The engagement portion is rigidly connected to the first portion. A collapsible joint joins the first portion to the second portion where the first longitudinal axis is aligned with the second longitudinal axis when a torque less than a predetermined value is applied to the collapsible joint and where the first longitudinal axis is offset from the second longitudinal axis when a torque greater than or equal to the predetermined value is applied to the collapsible joint.

7 Claims, 10 Drawing Sheets

METHOD AND APPARATUS FOR COUPLING A FIBER OPTIC CONNECTOR

This application is a continuation-in-part of application Ser. No. 09/238,608 filed Jan. 28, 1999 abandoned.

SUMMARY OF THE INVENTION

The present invention relates to an apparatus and method for coupling a fiber optic connector. More specifically, the invention provides for easily coupling a fiber optic connector to an optical assembly and for decoupling the connector from the assembly.

Fiber optic connectors are well-known in the art and are utilized to mate a first optical fiber to a second optical fiber so that optical signals can be transmitted between the fibers. In particular applications, connectors are utilized in optical assemblies to connect the assembly to an external fiber. However, due to the physical configuration of the assemblies, access to the connector within the assembly may be severely limited. The limited space available in the assemblies can make it difficult for an individual to internally couple and decouple the connector to the assembly.

Figure 1:
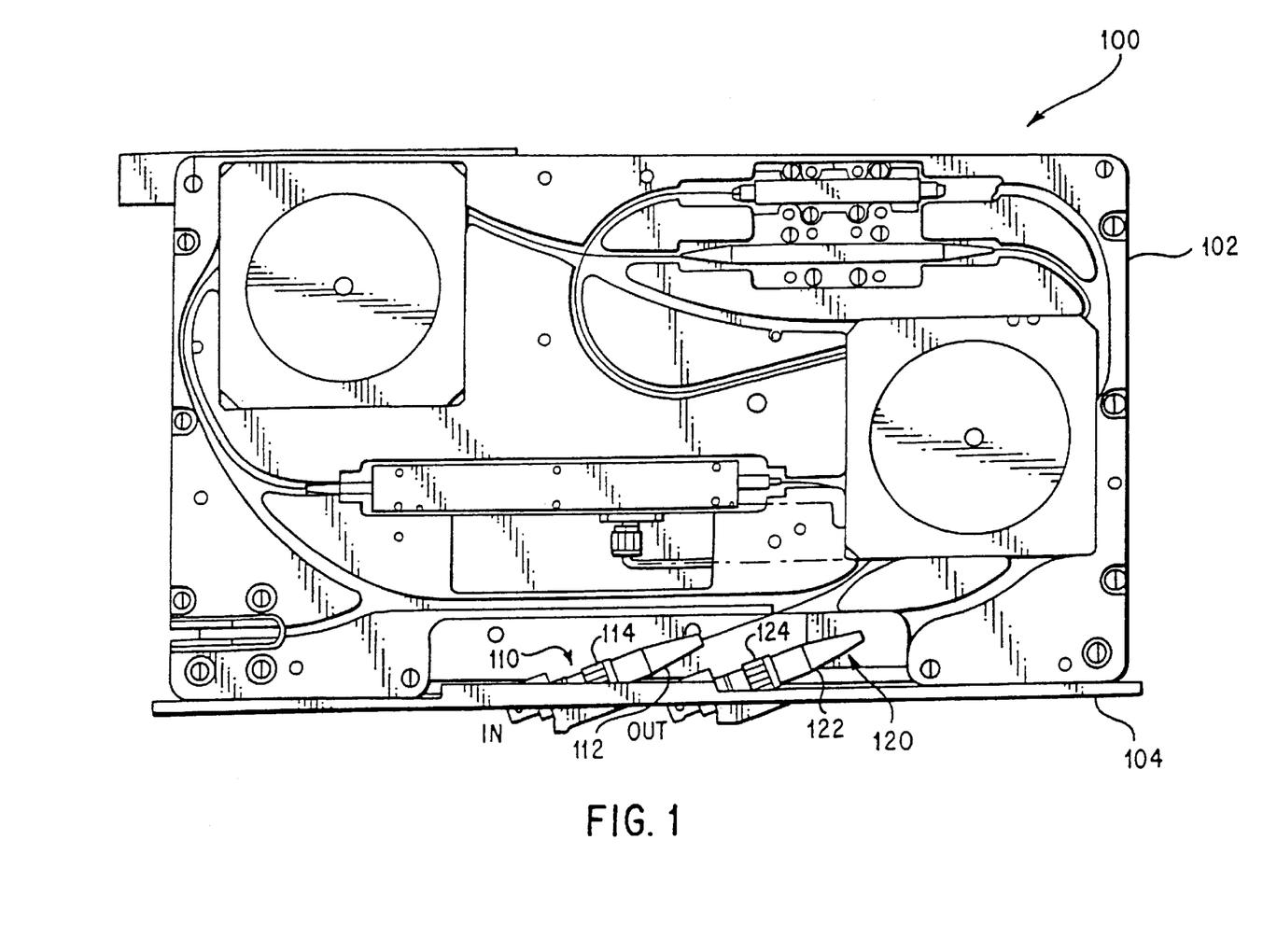
FIG. 1 is a top view of an optical assembly that includes an input signal fiber optic connected an output signal fiber optic connector.

FIG. 1 illustrates a representative optical assembly 100 that includes a tray 102 that houses optical components on it. The tray is internally installed within a larger piece of optical equipment. Optical assembly 100 could be any of a variety of assemblies, e.g., an amplifier, repeater, laser pump source, etc., and the optical components installed on tray 102 could also be any of a variety of components. A face plate 104 is provided on optical assembly 100 and serves as the interface for access to the components within optical assembly 100 from a location external to the optical assembly when the assembly has been installed in the larger equipment. As can be seen in FIG. 1, connectors 110 and 120 are provided within optical assembly 100 at face plate 104. Connector 110 is an input signal connector and connector 120 is an output signal connector. As can be understood, connectors external to face plate 104 would be connected to internal connectors 110 and 120 in order to input optical signals to optical assembly 100 and output optical signals from optical assembly 100, respectively.

Connectors 110 and 120 are threadedly mounted to face plate 104. Connector 110 includes a body portion 112 and a screw mount 114 and connector 120 includes a body portion 122 and screw mount 124. Each screw mount is rotatably attached to its respective body portion and mates with a male-threaded mounting structure provided on face plate 104, as is well-known in the art. In order to couple connectors 110, 120 to face plate 104, currently an operator must grasp the screw mount portion of the connectors in his/her fingers and screw the connector onto face plate 104. As can be understood, this requirement to grasp and manually screw the connectors onto the face plate can present problems. Very little physical space is provided between each connector and face plate 104. Thus, the connectors are difficult to grip and couple to the face plate.

It is not known to use wrenches known and designed for other purposes to couple and decouple the fiber optic connectors. Wrenches such as a "monkey wrench" are too large and bulky to be positioned within the constrained area of a fiber optic assembly and around a fiber optic connector. Also, known wrenches were not known to be utilized with fiber optic connectors because of an optical fiber's sensitive and relatively fragile structure.

Therefore, it would be desirable to provide an apparatus and improved method for coupling fiber optic connectors.

SUMMARY OF THE INVENTION

In accordance with the present invention, an apparatus and method for coupling a fiber optic connector is provided. In one embodiment for a fiber optic connector wrench in accordance with the present invention, the fiber optic connector wrench includes an engagement portion and a handle member having a first portion with a first longitudinal axis and a second portion with a second longitudinal axis. The engagement portion is rigidly connected to the first portion. A collapsible joint joins the first portion to the second portion where the first longitudinal axis is aligned with the second longitudinal axis when a torque less than a predetermined value is applied to the collapsible joint and where the first longitudinal axis is offset from the second longitudinal axis when a torque greater than or equal to the predetermined value is applied to the collapsible joint.

BRIEF DESCRIPTION OF THE DRAWINGS

The various of the invention will best be appreciated by simultaneous reference to the description which follows and the accompanying drawings, in which.

DETAILED DESCRIPTION

Figure 2:
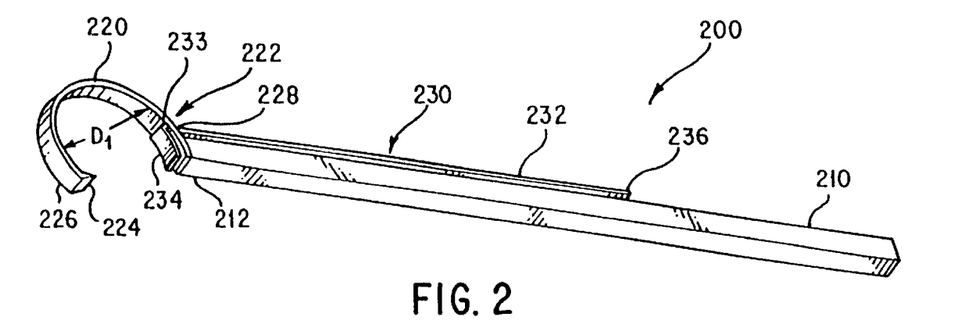
FIG. 2 is a perspective view of an embodiment for a fiber optic connector wrench in accordance with the present invention.
Figure 3:
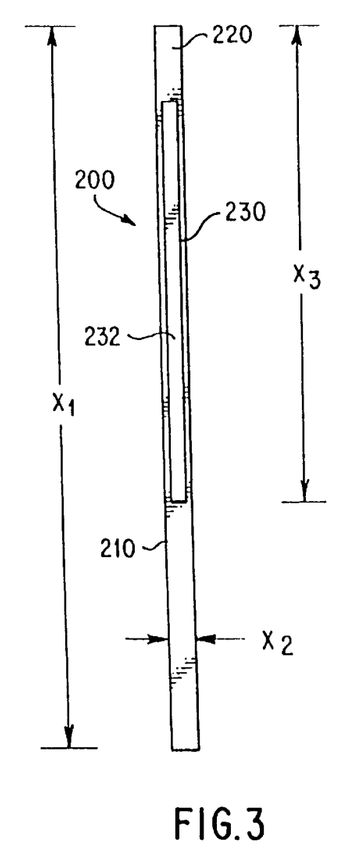
FIG. 3 is a rear view of the fiber optic connector wrench of FIG. 2.
Figure 4:
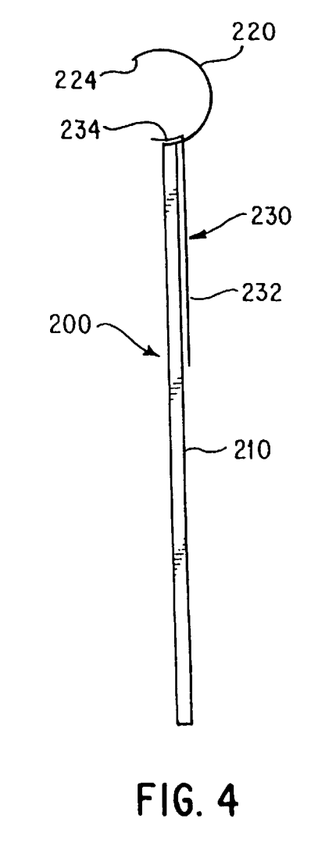
FIG. 4 is a side view of the fiber optic connector wrench of FIG. 2.

FIGS. 2 through 4 illustrate a first embodiment for a fiber optic connector wrench in accordance with the principles of the present invention. As can be seen in FIG. 2, fiber optic connector wrench 200 includes a handle member 210, an engagement portion 220, and a clamping member 230.

Handle member 210 is an elongated member and is utilized by a user of fiber optic connector wrench 200 to grip fiber optic connector wrench 200. Handle member 210 is generally rectangular in cross-section. Handle member 210 may be manufactured from any of a variety of materials, including metals or plastics, with the only consideration being that handle member 210 be able to resist any forces applied to it by an operator when using connector wrench 200.

Engagement portion 220 is included at a distal end 212 of handle member 210. Engagement portion 220 may be either integrally formed with handle member 210 or may be a separate structural element that is attached to handle member 210. The present invention is not limited to any particular configuration for the integration of engagement portion 220 with handle member 210. Engagement portion 220 is generally configured in an arcuate shape and can be comprised of a thin metal or plastic material. In the illustrated embodiment, engagement portion 220 extends beyond a semi-circle shape, but does not constitute a complete circle. Engagement portion 220 must be thin enough such that it is able to be positioned between structure associated with a fiber optic assembly, e.g., face plate 104 as discussed previously, and a connector when engagement portion 220 has been positioned around the connector. The diameter D, of engagement portion 220 is not rigidly defined, however, diameter $D_1$, in this embodiment, is large enough such that engagement portion 220 is able to be positioned around a fiber optic connector that is to be coupled to another component.

Engagement portion 220 may be comprised of a somewhat flexible member, however, engagement portion 220 must be sufficiently rigid such that it will be able to rotate a fiber optic connector when an operator is utilizing fiber optic connector wrench 200, as will be explained further later in this specification. Located at a distal end 226 of engagement portion 220 may be engagement teeth 224. Engagement teeth 224 may be either integrally formed with, or attached to, engagement portion 220 and extend within the semi-circular structure of engagement portion 220. Engagement teeth 224 may include multiple teeth or could be comprised of a single tooth structure. The purpose of engagement teeth 224, as will also be further explained later in this specification, are to engage with the fiber optic connector such that a more secure attachment between fiber optic connector wrench 200 and the fiber optic connector can be possibly achieved. However, the present invention is not required to be practiced with engagement teeth 224.

Also illustrated in FIG. 2 is clamping member 230. Clamping member 230 includes a pivot arm 232 and a clamp 234. Pivot arm 232 lies substantially parallel to handle member 210 and extends approximately one-half of the length of handle member 210. Pivot arm 232 is separated a distance from handle member 210 such that pivot arm 232 may be pivoted with respect to handle member 210. Distal end 233 of pivot arm 232 extends through a clamping member aperture 222 that is included in a proximal end 228 of engagement portion 220. Disposed on distal end 233 of pivot arm 232 within engagement portion 220 is clamp 234. Clamp 234 may be either integrally formed with pivot arm 232 or may be attached to pivot arm 232. Clamp 234 is generally comprised of a thin, curved member and is formed such that it lies generally parallel with a portion of engagement portion 220. Clamp 234 is separated from engagement portion 220 by a sufficient distance such that clamp 234 may be moved relative to engagement portion 220 as pivot arm 232 is pivoted.

As can be seen in FIG. 3, the overall length $X_1$ of fiber optic connector wrench 200 is approximately six inches. The width $X_2$ of fiber optic connector wrench 200 is approximately 0.125 inches and the length of fiber optic connector wrench 200 that extends from pivot arm 232 to the outer end of engagement portion 220 is a distance $X_3$ of approximately four inches. The radius of engagement portion 220 is approximately 0.389 inches. FIG. 4 provides a side view of fiber optic connector wrench 200. Engagement portion 220 is a thin member and has a thickness of approximately 0.06 inches.

Figure 5:
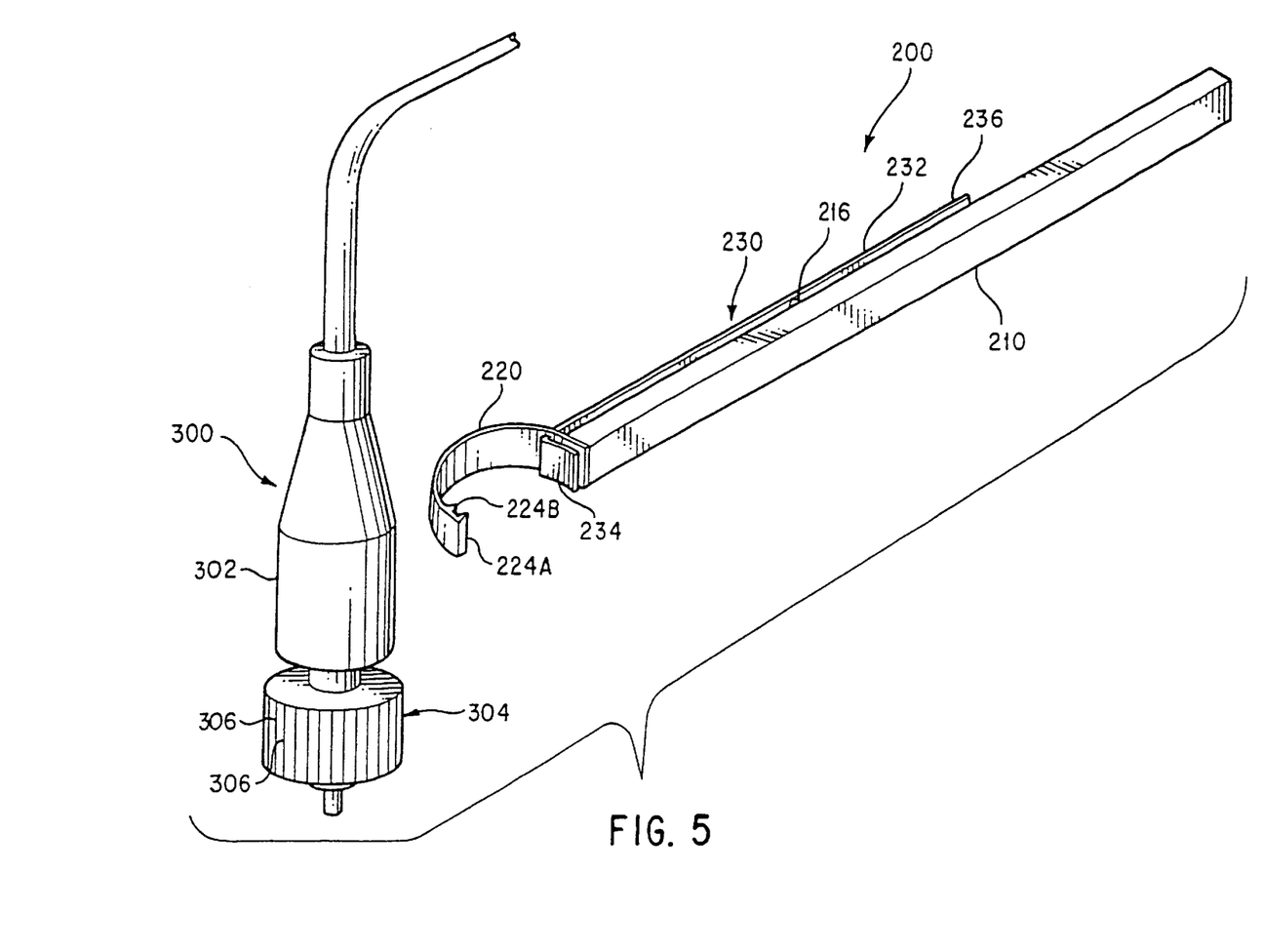
FIG. 5 is a perspective view of a second embodiment for a fiber optic connector wrench in a disengaged configuration with respect to a fiber optic connector.
Figure 6:
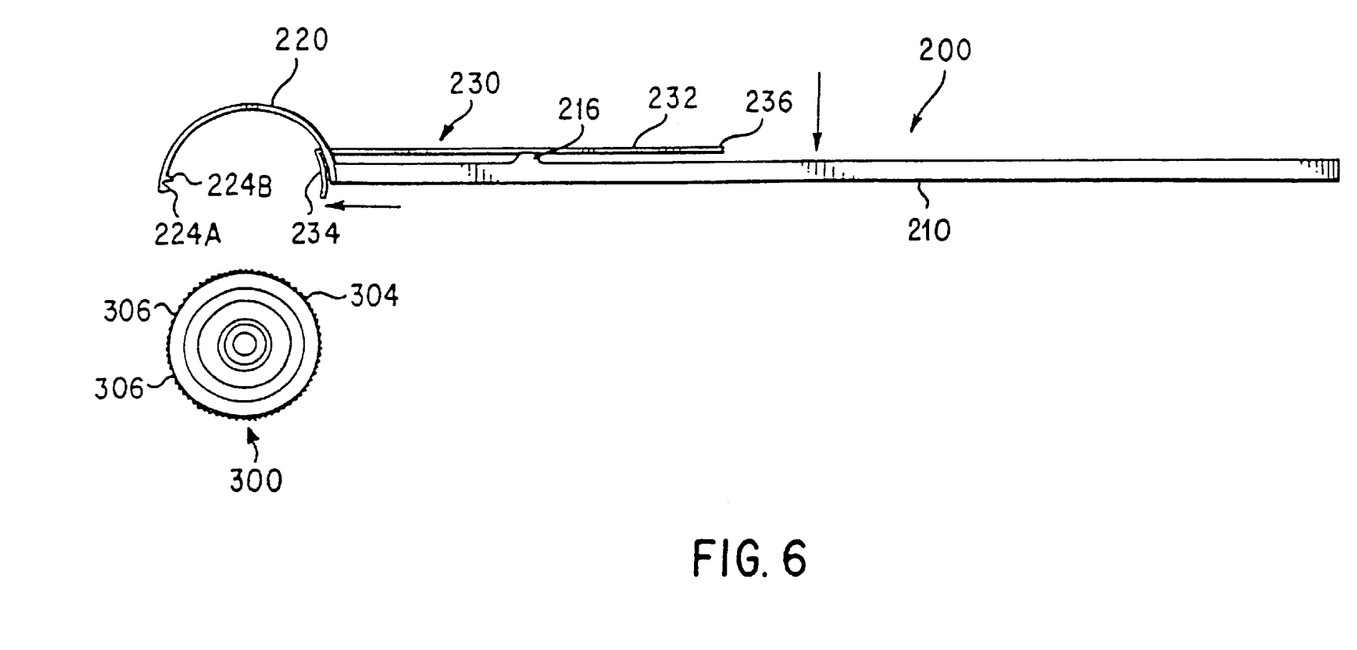
FIG. 6 is a top view of the fiber optic connector wrench and fiber optic connector of FIG. 5.

FIGS. 5 and 6 illustrate fiber optic connector wrench 200 in a disengaged configuration with respect to a fiber optic connector 300 which is to be coupled to another fiber optic component (not shown). As can be seen in FIGS. 5 and 6, the embodiment of fiber optic connector wrench 200 includes a handle member 210, an engagement portion 220, and a clamping member 230, as were previously described. Engagement portion 220 includes a first engagement tooth 224A and a second engagement tooth 224B at the distal end of engagement portion 220. Fiber optic connector 300 is illustrated as including a body portion 302 and a screw mount 304, which is rotatably disposed on connector 300 and is utilized, as is well-known in the art, to couple fiber optic connector 300 to another optical component. Screw mount 304 includes raised edges 306 around its circumference which, as is also well-known in the art, provide for a better grasping surface for a person that is utilizing the prior known method of coupling the connector to a component by manually rotating screw mount 304 with the person's fingers. The present invention is not limited to only being utilized with a fiber optic connector 300 as illustrated in FIGS. 5 and 6. The present invention may be practiced with any of a variety of fiber optic connectors that are known in the art.

As can be seen particularly in FIG. 6, the diameter of engagement portion 220 is slightly larger than the diameter of fiber optic connector 300, including space allowances for engagement teeth 224A, 224B and clamp 234, such that engagement portion 220 may be positioned around screw mount 304 of fiber optic connector 300. As can also be seen in FIG. 6, the embodiment of fiber optic connector wrench 200 in this figure includes pivot mount 216 which is included on handle member 210. Pivot mount 216 is generally triangular in shape with its apex contacting clamping member 230. As can be understood, if an operator was to apply pressure to proximal end 236 of clamping member 230 in the direction as shown, the interaction of pivot mount 216 with pivot arm 232 of clamping member 230 would cause clamp 234 to be moved in the direction as illustrated such that it would extend further within the diameter of engagement portion 220. As will be further explained later in this specification, as clamp 234 is moved as a result of the pivoting of pivot arm 232, clamp 234 will rigidly engage screw mount 304 of fiber optic connector 300 such that as fiber optic connector wrench 200 is rotated screw mount 304 of fiber optic connector 300 will also be rotated.

Whereas it is not required that pivot mount 216 be provided on handle member 210, its inclusion may provide additional mechanical advantage for a user of fiber optic connector wrench 200 when attempting to pivot pivot arm 232 of clamping member 230. If pivot mount 216 is provided on handle member 210, as can be understood, it would be advantageous to position pivot mount 216 on handle member 210 such that maximum mechanical advantage may be provided to pivot arm 232.

Figure 7:
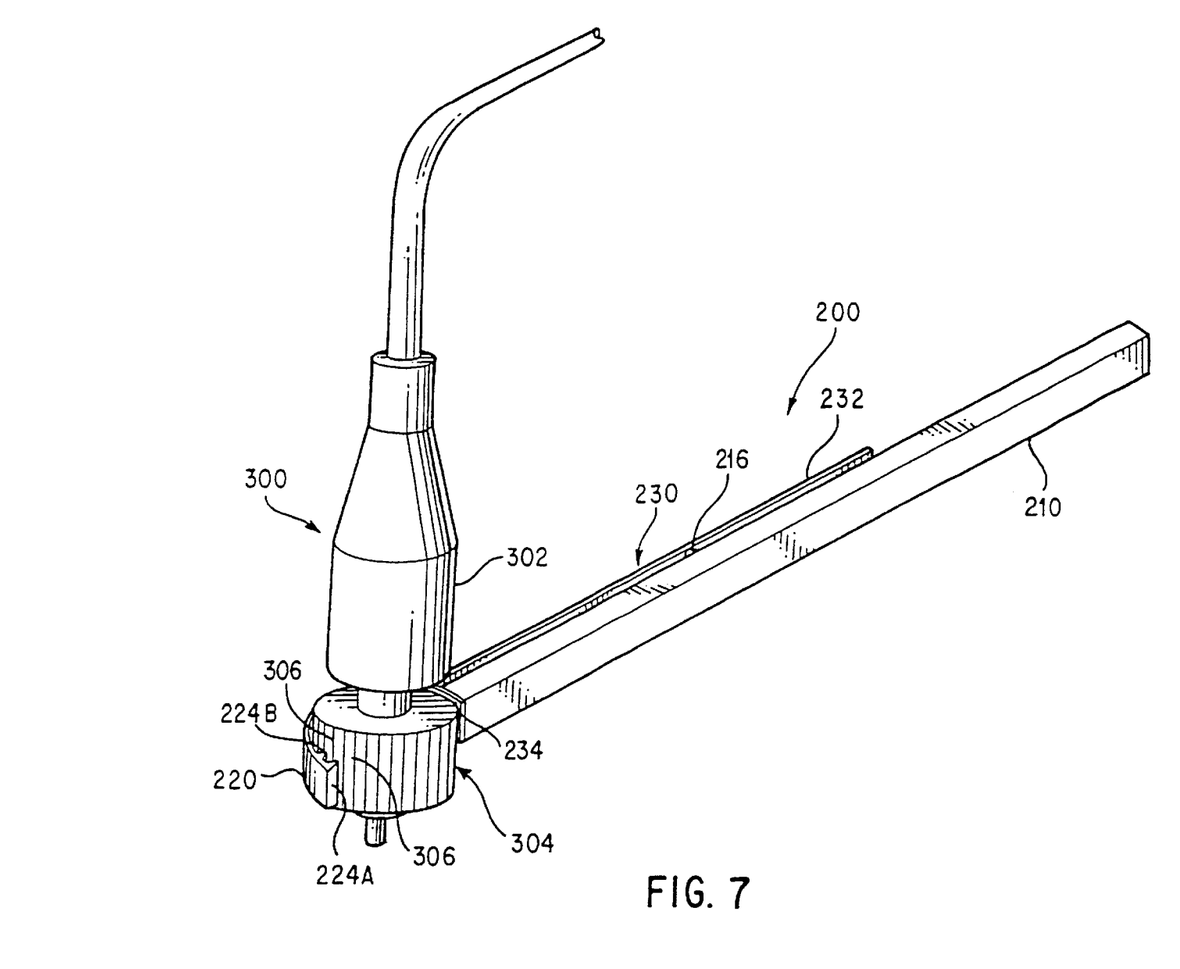
FIG. 7 is a perspective view of the fiber optic connector wrench of FIG. 5 in an engaged configuration with respect to a fiber optic connector.
Figure 8:
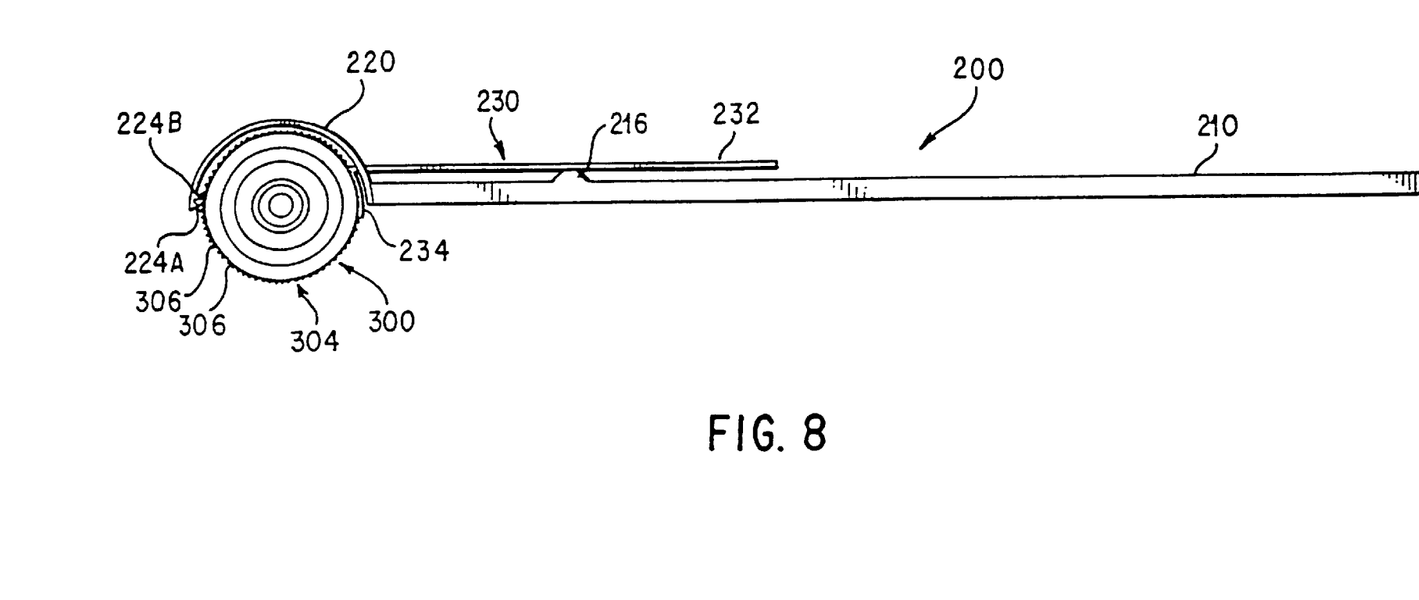
FIG. 8 is a top view of the fiber optic connector wrench and fiber optic connector of FIG. 7.

FIGS. 7 and 8 illustrate the fiber optic connector wrench 200 of FIGS. 5 and 6 in an engaged configuration with respect to fiber optic connector 300. As can be seen, engagement portion 220 of fiber optic connector wrench 200 has been positioned around screw mount 304 of fiber optic connector 300. Engagement teeth 224A, 224B of engagement portion 220 have been positioned between raised edges 306 that are included on screw mount 304. Clamp 234 is also positioned proximal to screw mount 304. As pivot arm 232 is pivoted against pivot mount 216, clamp 234 will be forced into rigid contact with screw mount 304 such that as fiber optic connector wrench 200 is rotated, screw mount 304 of fiber optic connector 300 will also be rotated such that it may be either coupled to another optical component or uncoupled from another optical component. The interaction of teeth 224A, 224B on one side of screw mount 304 and clamp member 234 on another, opposite side of screw mount 304 when pivoted by pivot arm 232, provides for firm engagement of fiber optic connector 300 by fiber optic connector wrench 200 such that fiber optic connector 300 may be rotated by fiber optic connector wrench 200. In this manner, the present invention provides an apparatus and method for coupling a fiber optic connector without requiring the operator to manually grasp the fiber optic connector with his/her fingers.

The connector wrench of the present invention also allows an operator to utilize the wrench in a ratchet-type method of operation. Because of the limited space available in the assemblies where the fiber optic connector may be located, it may not be possible to merely engage the screw mount 304 of the fiber optic connector with the connector wrench and rotate the screw mount one or more complete revolutions until the screw mount is secured to another structure. Therefore, the present invention allows an operator to utilize the fiber optic connector wrench in a ratchet-type method. The user is able to engage teeth 224A, 224B and clamp member 234 on screw mount 304, as described above, from a first starting position and rotate the connector wrench, and thus the screw mount, to a second position which may be any partial revolution of the screw mount. The operator may then disengage the teeth and clamp member from the screw mount, while maintaining the screw mount within the engagement portion 220, and rotate the connector wrench around the screw mount to return to a location substantially near the first starting position. The user then re-engages the teeth and clamp member on the screw mount and rotates the connector wrench and screw mount another partial revolution. In this manner, the connector wrench may be utilized in a ratchet-type manner and provides for maintaining the screw mount within the engagement portion while easily rotating the screw mount within the constrained space available in the assembly where the fiber optic connector must be attached.

Several alternatives to the previously disclosed embodiments are contemplated. For example, it is not required that engagement teeth be provided on engagement portion 220 nor is it required that clamping member 230, including clamp 234, be utilized. Engagement portion 220 could be sized and formed such that it could be configured with a slightly smaller diameter than the fiber optic connector that it is to engage. If engagement portion 220 was provided with a slightly smaller diameter than the fiber optic connector, engagement portion 220 could be formed of a material that would slightly deform as engagement portion 220 was fitted around the fiber optic connector. Forming engagement portion 220 of a deformable material would allow for engagement portion 220 to be fitted around the fiber optic connector while also providing for a rigid connection between engagement portion 220 and the fiber optic connector. Thus, whereas in the previous embodiments the engagement teeth and the clamp provide for rigid connection between the engagement portion and the fiber optic connector, in this alternative embodiment, the deformable structure itself of engagement portion 220 would provide for rigid connection between the engagement portion and the fiber optic connector.

Alternatively, if clamping member 230 was utilized with the present invention, it is not required that clamping member 230 be pivoted in order to engage clamp 234 with the fiber optic connector. It is contemplated that clamping member 230 could be slidably coupled with respect to engagement portion 220 and handle member 210 such that, in order to engage clamp 234 with a fiber optic connector, clamping member 230 could be slid distally along handle member 210. Sliding clamping member 230 distally along handle member 210 will engage clamp 234 with the fiber optic connector. The operator would maintain clamping member 230 in this forward disposed position such that clamp 234 remains in contact with the fiber optic connector in order to rotate the fiber optic connector with the fiber optic connector wrench. The operator could maintain clamping member 230 in the forward disposed position by manually holding clamping member 230 with his/her hands, e.g., such as applying pressure to the clamping member with a thumb, or a locking mechanism could be provided on fiber optic connector wrench 200.

A locking mechanism could be formed in any of a variety of configurations and the present invention is not limited to any particular configuration. One possibility is to provide a cam surface on the handle member and a cam on the clamping member. As the clamping member is slid distally along the handle member to engage the clamp with the fiber optic connector, the cam on the clamping member could ride up and over the camming surface that would extend from the handle member. When the cam has passed over the camming surface, the clamp would be engaged with the fiber optic connector and the clamping member would be prevented from moving proximally along the handle member by the interaction of the cam and the camming surface on the handle member. Thus, the clamp could be maintained in contact with the fiber optic connector by the cam and camming surfaces. When the operator desired to disengage the clamp from the connector, the operator could manually lift the cam over the camming surface such that the clamping member could be moved proximally along the handle member.

Additionally, clamp 234 could be provided with engagement teeth on it. The engagement teeth could assist clamp 234 in gripping the fiber optic connector, similar to the manner in which teeth 224 are utilized on the distal end 226 of engagement portion 220, as described previously.

Figure 9:
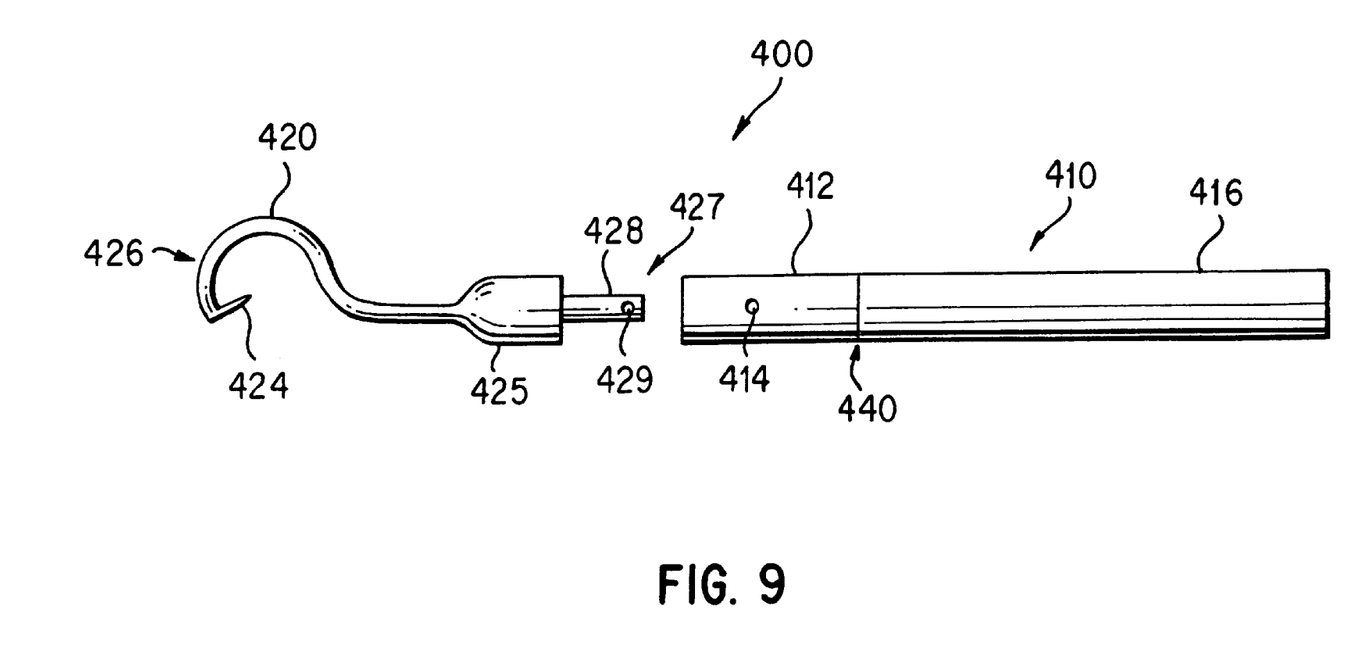
FIG. 9 illustrates a third embodiment for a fiber optic connector wrench in a partially disassembled configuration in accordance with the principles of the present invention.

FIG. 9 illustrates a third embodiment for the fiber optic connector wrench in accordance with the present invention. As with the previously disclosed embodiments, fiber optic connector wrench 400 includes a handle member 410 and an engagement portion 420. Engagement portion 420 is formed as a single structural member with an engagement tooth 424 located at a distal end 426 of the engagement portion. A connecting member 428 is included at the proximal end 427 of the engagement portion. Connecting member 428 is slightly smaller in diameter than the base 425 of engagement portion 420 and is inserted within first portion 412 of handle member 410. An aperture 429 is provided within connecting member 428 that aligns with an aperture 414 included within first portion 412 of handle member 410 when connecting member 428 is inserted within first portion 412. A securement member (not shown) such as, for example, a screw may be inserted through the aligned apertures to retain engagement portion 420 within handle member 410.

As can also be seen in FIG. 9, handle member 410 is comprised of first portion 412 and second portion 416. First portion 412 is joined to second portion 416 through a collapsible joint 440. Collapsible joint 440 is designed to deform when a force greater than or equal to a predetermined value is applied to the collapsible joint. In this manner, when a user is utilizing fiber optic connector wrench 400 to tighten a connector, the wrench will deform when a torque greater than what is desired is applied to the connector. As such, the wrench operates as a torque wrench to prevent damage to the connector if the operator applies too much force to the connector when operating the wrench by hand.

Collapsible joint 440 may incorporate a variety of mechanical structures and the present invention is not limited to any particular configuration for the collapsible joint. All that is required is that the structure deform when a torque, or force, equal to or greater than a predetermined value is applied to the connector through the wrench and that the structure remain rigid if a force less that the predetermined value is applied to the connector.

Figure 10:
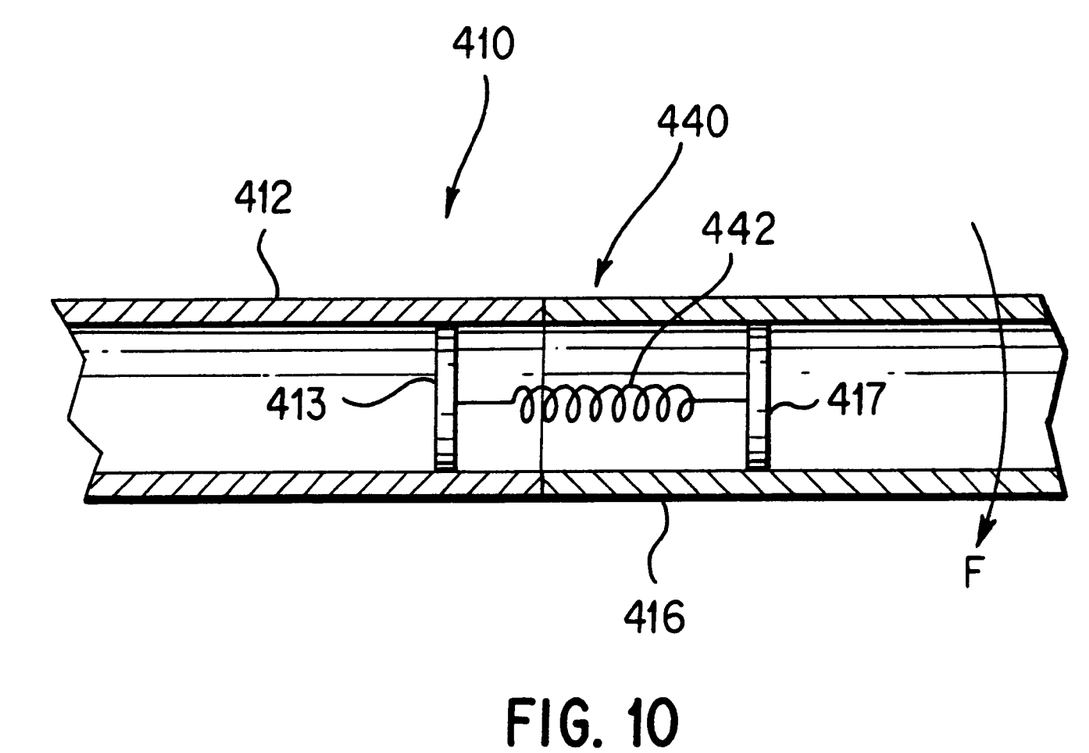
FIG. 10 is a cross-sectional view of an embodiment of a collapsible joint.

One embodiment for a collapsible joint is illustrated in FIG. 10. As can be seen, collapsible joint 440 includes a tension spring 442 which is disposed within first portion 412 and second portion 416 of handle member 410 and extends between the first and second portions. Spring 442 is attached to a support member 413 within first portion 412 at a first end and to a support-member 417 within second portion 416 at a second end. When a force F is applied to handle member 410 that is less than or equal to a force required to elongate spring 442, first portion 412 will remain aligned with second portion 416 and the handle member 410 will rotate in response to the applied force. When the force F is greater than the force required to elongate spring 442, second portion 416 will rotate with respect to first portion 412.

Whereas any predetermined value for the force required for deforming collapsible joint 440 can be specified, it has been found that a torque of no more than 4 inch-pounds should be applied to the connector by the wrench 400. The application of torques of this value or less will ensure that the connector is not damaged by the connector wrench.

As stated above, any of a variety of other mechanical structures could be utilized for collapsible joint 440. These structures could include a ball and socket joint with complementary interlocking structures such as a cam and cam surface. Alternatively, a single, unitary structural member that is deformable upon application of a specified force could be utilized, such as, for example, a plastic, bendable rod. One embodiment for a handle member that incorporates a collapsible joint is that as available from M/A-COM, Inc., Interconnect Division, with a part number of 2098-0275-54.

Figure 11:
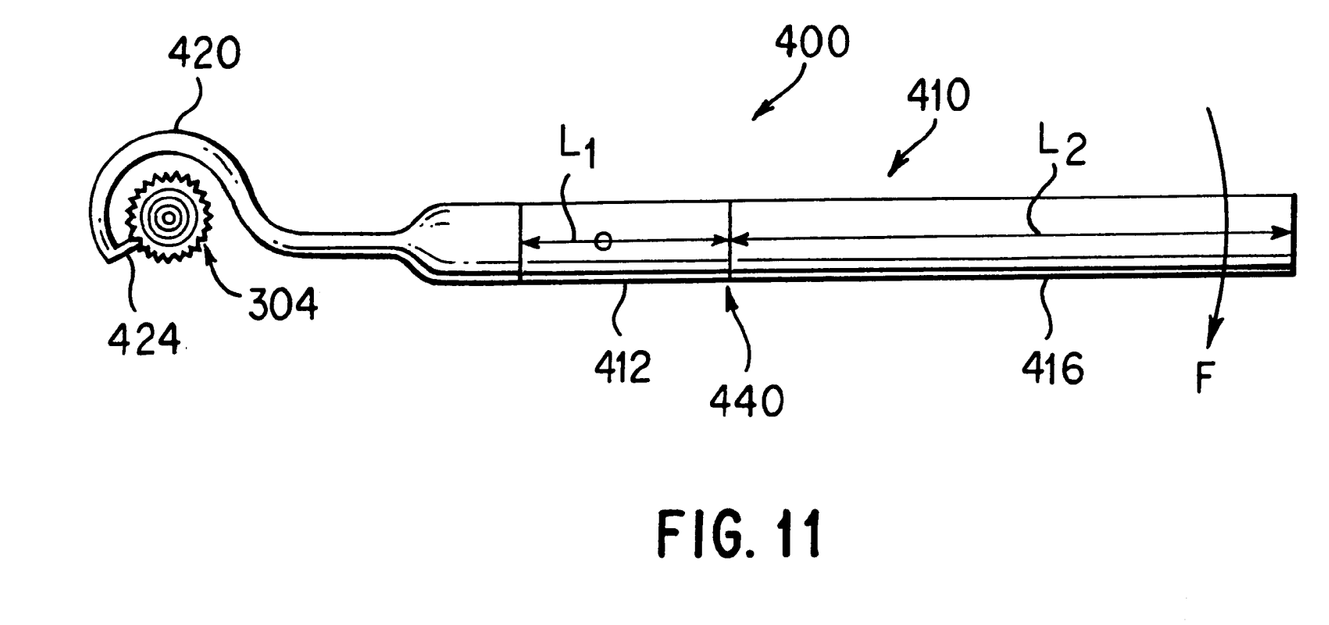
FIG. 11 is a top view of the fiber optic connector wrench of FIG. 9 in an engaged configuration with respect to a fiber optic connector where a predetermined torque has not been equaled or exceeded such that the collapsible joint has not deformed.

FIG. 11 illustrates connector wrench 400 as utilized to couple a fiber optic connector. As can be seen, a fiber optic connector screw mount 304 is disposed within engagement portion 420. When a force F of, for example, four inch-pounds or less is applied to handle member 410, the first longitudinal axis $L_1$ of first portion 412 is aligned with the second longitudinal axis $L_2$ of second portion 416. Thus, wrench 400 may be utilized to rotate screw mount 304, and thus the fiber optic connector, when the force F is less than or equal to a value of 4 inch-pounds.

Figure 12:
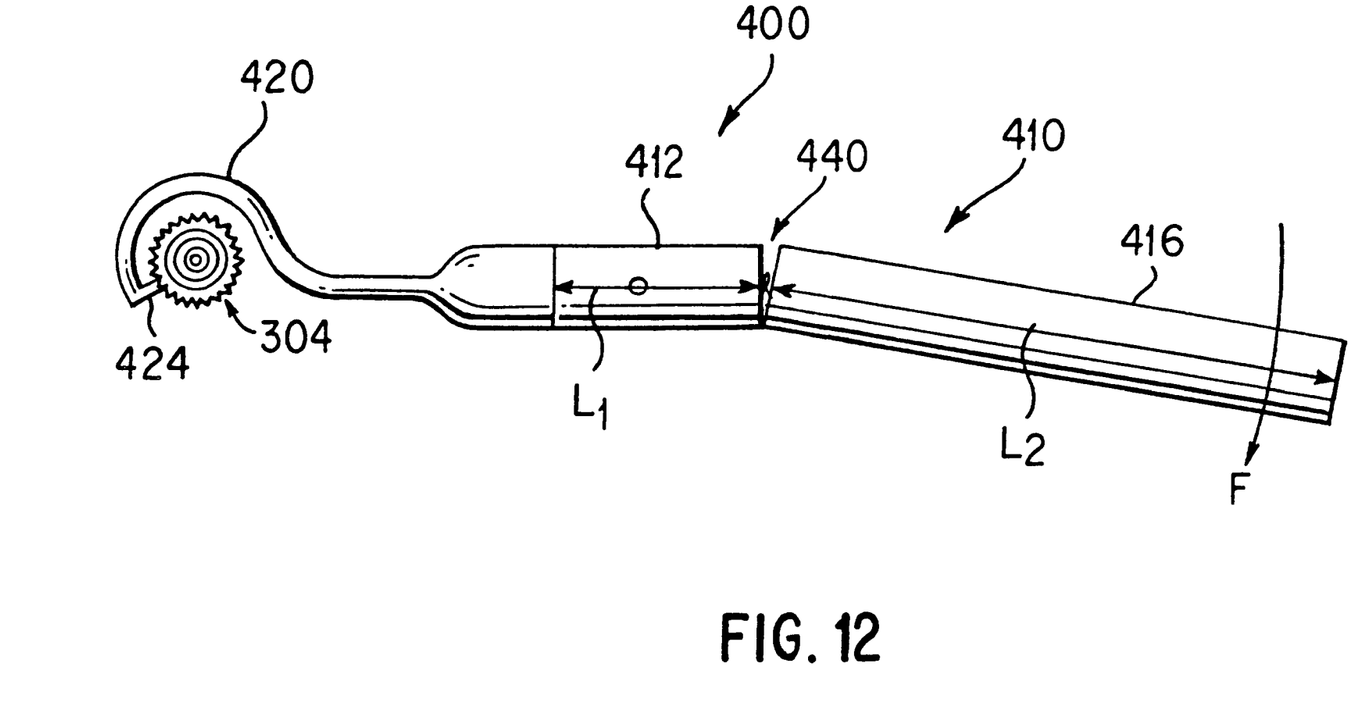
FIG. 12 is a top view of the fiber optic connector wrench of FIG. 11 in an engaged configuration with respect to a fiber optic connector where a predetermined torque has been equaled or exceeded such that the collapsible joint has deformed.

FIG. 12 illustrates fiber optic connector wrench 400 when a force F of greater than 4 inch-pounds is applied to handle member 410. As can be seen, when this force is applied to handle member 410, collapsible joint 440 deforms such that first longitudinal axis $L_1$ of first portion 412 is offset from the second longitudinal axis $L_2$ of second portion 416. Thus, in this configuration for wrench 400, the user will be alerted that a torque greater than or equal to a predetermined value is being applied to the handle member 410.

It is contemplated that the predetermined value of torque that may be applied to handle member 410 before collapsible joint 440 will deform may be adjusted. For example, the spring tension may be adjusted if a tension spring is utilized in the collapsible joint. Other adjustment mechanisms may be implemented as well.

A collapsible joint could be incorporated into any of the wrench embodiments described previously, thus, a wrench with a collapsible joint could include a clamping member, a pivot mount, etc. Wrench 400 is not limited to only being practiced as described in the exemplary embodiment.

In this manner, the fiber optic connector wrench of the present invention provides an apparatus and method for coupling a fiber optic connector. The fiber optic connector wrench is formed such that it is able to be positioned around the fiber optic connector within the confined space that is usually available in a fiber optic assembly. Whereas the disclosed embodiments discuss a hand-operated wrench, the wrench could be operated by a machine. The wrench could be positioned within a machine that could be rotated either electrically or mechanically which in-turn would rotate the connector wrench and, consequently, the connector grasped within the wrench. For the wrench embodiments that do not include the collapsible joint, a torque or pressure sensor could be provided within the machine such that only a specified amount of torque could be applied to the connector.

The disclosed embodiments are illustrative of the various ways in which the present invention may be practiced. Other embodiments can be implemented by those skilled in the art without departing from the spirit and scope of the present invention.

What is claimed is:

1. A fiber optic connector wrench for coupling a fiber optic connector to an optical assembly, said wrench comprising:

an engagement portion comprising an engagement tooth disposed at a distal end of said engagement portion and an aperture located at a proximal end of said engagement portion;

a handle member attached to said proximal end of said engagement portion; and a clamping member comprising:

a pivot arm arranged substantially parallel to and separated a distance from said handle member such that said pivot arm may be pivoted with respect to said handle member; wherein the distal end of said pivot arm extends through said aperture of said engagement portion, and a clamp disposed on said distal end of said pivot arm and separated from said engagement portion by a distance such that said clamp is movable relative to said engagement portion as said pivot arm is pivoted.

2. The fiber optic connector wrench of claim 1 wherein said engagement portion is semi-circular in shape.

3. The fiber optic connector wrench of claim 1 wherein a second engagement tooth is disposed at the distal end of said engagement portion.

4. The fiber optic connector wrench of claim 1 wherein said engagement portion has a thickness of 0.06 inches.

5. The wrench of claim 1 further comprising a pivot mount formed on said handle member and operably associated with said clamping member.

6. The wrench of claim 5 wherein said pivot mount is triangularly-shaped and wherein an apex of said pivot mount contacts said clamping member at a position approximately halfway along the length of said clamping member.

7. The wrench of claim 1 wherein said clamping member is slidably received within said aperture of said engagement portion.

* * * * *